US011923589B2

(12) United States Patent
Hirata

(10) Patent No.: US 11,923,589 B2
(45) Date of Patent: Mar. 5, 2024

(54) ELECTRIC COUPLING OF A SUBSTRATE INTEGRATED WAVEGUIDE CAVITY RESONATOR TO A SUSPENDED SUBSTRATE STRIPLINE LOW PASS FILTER FOR INTRODUCING A NOTCH RESPONSE

(71) Applicant: BENCHMARK ELECTRONICS, INC., Tempe, AZ (US)

(72) Inventor: Francisco Iwao Hirata, Tempe, AZ (US)

(73) Assignee: BENCHMARK ELECTRONICS, INC.

( * ) Notice: Subject to any disclaimer, the term of this patent is extended or adjusted under 35 U.S.C. 154(b) by 0 days.

(21) Appl. No.: 17/734,940

(22) Filed: May 2, 2022

(65) Prior Publication Data

US 2023/0352805 A1 Nov. 2, 2023

(51) Int. Cl.

*H01P 1/208* (2006.01)
*H01P 1/20* (2006.01)
*H01P 3/08* (2006.01)
*H01P 3/12* (2006.01)
*H01P 5/107* (2006.01)

(52) U.S. Cl.

CPC .............. *H01P 1/2088* (2013.01); *H01P 1/20* (2013.01); *H01P 3/08* (2013.01); *H01P 3/121* (2013.01); *H01P 5/107* (2013.01)

(58) Field of Classification Search

CPC .... H01P 1/203; H01P 1/20345; H01P 1/2088; H01P 3/087

USPC .................................................. 333/204, 208

See application file for complete search history.

(56) References Cited

U.S. PATENT DOCUMENTS 4,521,755 A * 6/1985 Carlson et al. ......... H01P 3/087 333/204
5,319,329 A * 6/1994 Shiau et al. ............ H01P 1/203 333/204
2021/0337638 A1* 10/2021 Kunkee et al. ....... H01P 11/007

* cited by examiner

*Primary Examiner* — Benny T Lee

(74) *Attorney, Agent, or Firm* — Weiss & Moy, PC; Jeffrey D. Moy

(57) ABSTRACT

A Substrate Integrated Wave (SIW) coupled to a Suspended Substrate Stripline (SSS) filter for introducing a notch response has a substrate having metal layers formed on a top surface and a bottom surface thereof. A filter circuit is formed on the top surface of the substrate. A top ground plate is provided and has an air cavity formed on a bottom surface of the top ground plate. The air cavity on the top ground plate is positioned directly above the filter circuit when the top ground plate is positioned on the top surface of the substrate. A bottom ground plate is provided and has an air cavity formed on a top surface of the bottom ground plate. The air cavity on the bottom ground plate is positioned directly below the filter circuit when the bottom ground plate is positioned on the bottom surface of the substrate. A SIW cavity resonator is coupled to the filter circuit by means of an aperture to create a notch response in the SSS filter.

20 Claims, 4 Drawing Sheets

ELECTRIC COUPLING OF A SUBSTRATE INTEGRATED WAVEGUIDE CAVITY RESONATOR TO A SUSPENDED SUBSTRATE STRIPLINE LOW PASS FILTER FOR INTRODUCING A NOTCH RESPONSE

TECHNICAL FIELD

The present application generally relates to a filter for a communication system, and more specifically, to a Suspended Substrate Stripline (SSS) Low Pass Filter (LPF) electrically coupled to a Substrate Integrated Waveguide (SIW) cavity resonator for introducing a notch response.

BACKGROUND

Radio frequency (RF), microwave, and millimeter wave (mmW) filters may be key components in communication systems such as base stations, large-scale antennas, mobile phones, and the like. The use of mmW for 5G communications may leads to complex filtering challenges; a challenging task above 20 GHz, where filters with high performance characteristics are highly desirable such as: low insertion loss, good transition band, high out of band rejection, and the like.

One well known technology for filters that offers exceptionally low losses and high out of band rejection characteristics is the Suspended Substrate Stripline (SSS) technology. SSS is a Transversal Electromagnetic (TEM) transmission line that may be widely used in microwave and mmW systems. As may be seen in FIG. 1, SSS filters 100 are distributed designs that may consist of a substrate 103 having metalized layers 101 and 102 placed between two metallic ground cavities 104 and 105. The dielectric between the substrate and the metallic cavity is air. In SSS devices, a thin dielectric substrate may be used to minimize substrate losses and to improve temperature stability. Examples of this transmission media can be found in multiplexers, directional couplers, and the like. The broad range of realizable impedance values as well as the possibility to use both sides of the substrate for circuit pattern, may make this transmission media ideal for the design of Low Pass Filters (LPFs) and High Pass Filters (HPFs).

FIG. 2 depicts a graph showing operation of the SSS filters 100. The graph depicts a full-wave simulation of the SSS filter 100.

LPFs and HPFs implemented in SSS technology may have the following characteristics: high Quality factor (Q), low insertion loss, high frequency of operation, high out of band rejection, broadband, good temperature stability, very rugged design, and the like, and can be implemented with distributed elements or in a quasi-lumped approach. The surface mountable approach for the connectorized SSS may be the suspended integrated strip-line (SISL). SSS LPFs and HPFs may be cascaded together to form a very broadband bandpass filter (BPF). A bandstop (notch) characteristic can also be added to the passband response or to the transition band by cascading a SSS LPF filter with a SSS bandstop (notch) filter. An alternative approach for introducing a notch response in the passband is to use a defected stripline structure.

Another filter technology that has gained a lot of interest in recent years for the design of microwave and mmW filters may be the Substrate Integrated Waveguide (SIW). As may be seen in FIG. 3, a SIW 200 is the printed version of a conventional waveguide and may be fabricated basically with two parallel rows of plated through-holes (hereinafter vias) 204, or slots in a thin dielectric substrate 201 and sandwiched between two metal layers 202 and 203. The vias 204 may connect the top 202 and bottom 203 grounded metal plates. In SIW, only $TE_{n0}$ modes can exist. SIW has many advantages if compared with conventional waveguide technology, including easy integration with planar circuitry, low cost, mass production, miniaturization, and the like. A bandstop characteristic can be added to the passband of the SIW line by coupling a SIW cavity resonator by means of an aperture.

The integration of a SIW cavity with planar technology, such as Coplanar Waveguide (CPW), Microstrip or Stripline, has led to the realization of different research work in mmW transitions. However, there has been little work that relate to the use of a SIW cavity resonator with a planar transmission line to produce a bandstop (notch) response.

A SSS LPF can be cascade with a SIW cavity notch filter to produce a notch response in the passband or at the transition band, however, a SSS to SIW transition would be required, making the integration of both structures bulky.

Therefore, it would be desirable to provide a system and method that overcomes the above. The system and method would provide a novel integration between a SSS filter LPF and a SIW cavity resonator. The SSS LPF would be electrically coupled to a SIW cavity resonator for introducing a notch response.

SUMMARY OF THE INVENTION

In accordance with one embodiment, the integration of a Substrate Integrated Waveguide (SIW) with a Suspended Substrate Stripline (SSS) filter for introducing a notch response is disclosed. The SSS filter has a substrate having metal layers formed on a top surface and a bottom surface thereof. A filter circuit is formed on the top surface of the substrate. A top ground plate is provided and has an air cavity formed on a bottom surface of the top ground plate, wherein the air cavity on the top ground plate is positioned directly above the filter circuit when the top ground plate is positioned on the top surface of the substrate. A bottom ground plate is provided and has an air cavity formed on a top surface of the bottom ground plate, wherein the air cavity on the bottom ground plate is positioned directly below the filter circuit when the bottom ground plate is positioned on the bottom surface of the substrate. A Substrate Integrated Waveguide (SIW) cavity resonator is coupled to the filter circuit to create a notch response in the SSS filter.

In accordance with one embodiment, the integration of a Substrate Integrated Waveguide (SIW) with a Suspended Substrate Stripline (SSS) Low Pass Filter (LPF) for introducing a notch response is disclosed. The SSS LPF has a substrate having metal layers formed on a top surface and a bottom surface thereof. A LPF circuit is formed on the top surface of the substrate. A top ground plate is provided and has an air cavity formed on a bottom surface of the top ground plate, wherein the air cavity on the top ground plate is positioned directly above the LPF circuit when the top ground plate is positioned on the top surface of the substrate. A bottom ground plate is provided and has an air cavity formed on a top surface of the bottom ground plate, wherein the air cavity on the bottom ground plate is positioned directly below the LPF circuit when the bottom ground plate is positioned on the bottom surface of the substrate. A Substrate Integrated Waveguide (SIW) cavity resonator is coupled to the LPF circuit to create a notch response in the SSS LPF. A plurality of vias is formed on the substrate, wherein the plurality of vias comprises: two parallel rows of vias extending through the substrate, wherein the filter is positioned between the parallel rows of vias and a set of vias extending through the substrate delimiting an area of the SIW cavity resonator. An opening is formed in the set of vias delimiting the area of the SIW cavity resonator for coupling the SIW cavity resonator to the LPF circuit.

In accordance with one embodiment, the integration of a Substrate Integrated Waveguide (SIW) with a Suspended Substrate Stripline (SSS)) Low Pass Filter (LPF) for introducing a notch response is disclosed. The SSS LPF has a substrate having metal layers formed on a top surface and a bottom surface thereof. A LPF circuit is formed on the top surface of the substrate. A top ground plate is provided and has an air cavity formed on a bottom surface of the top ground plate, wherein the air cavity on the top ground plate is positioned directly above the LPF circuit when the top ground plate is positioned on the top surface of the substrate. A bottom ground plate is provided and has an air cavity formed on a top surface of the bottom ground plate, wherein the air cavity on the bottom ground plate is positioned directly below the LPF circuit when the bottom ground plate is positioned on the bottom surface of the substrate. A pair of Substrate Integrated Waveguide (SIW) cavity resonators is coupled to the LPF circuit to create a notch response in the SSS LPF. A plurality of vias are formed on the substrate, wherein the plurality of vias comprises: two parallel rows of vias extending through the substrate, wherein the filter is positioned between the parallel rows of vias; a first set of vias extending through the substrate delimiting an area of a first SIW cavity resonator, wherein an opening is formed in the first set of vias delimiting the area of the first SIW cavity resonator for coupling the first SIW cavity resonator to the LPF circuit; and a second set of vias extending through the substrate delimiting an area of a second SIW cavity resonator, wherein an opening is formed in the second set of vias delimiting the area of the second SIW cavity resonator for coupling the second SIW cavity resonator to the LPF circuit.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the detailed description of the drawings to refer to the same or like parts.

DETAIL DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary circuit and method integrate a SIW cavity resonator to a SSS LPF. Depending on the size of the SIW cavity resonator, a notch response can be placed at a passband or at a transition band, thus improving the rejection characteristic with the last option. The coupling between the SIW cavity resonator and the SSS LPF may be controlled by means of a small aperture or iris, separated by vias. The SSS filter and the SIW cavity resonator may be integrated on the same substrate or substrates (when stacking multiple bonding and core layers). Metallic plates may provide the necessary ground and shielding.

Figure 4:
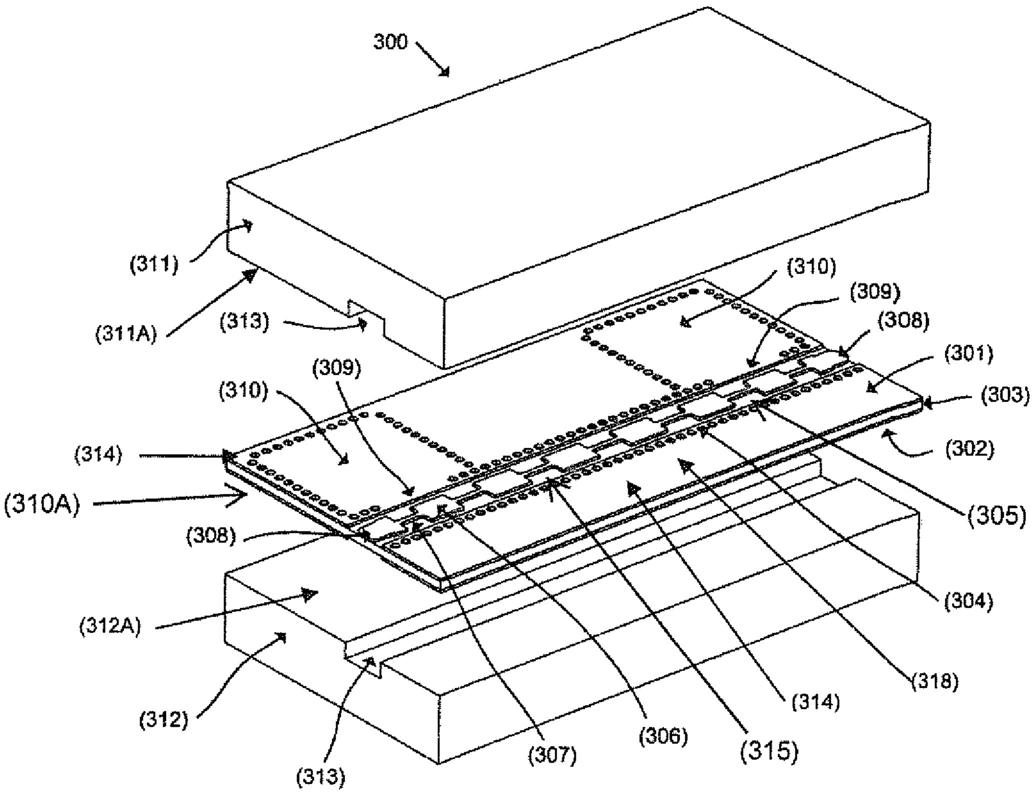
FIG. 4 is a perspective view of an exemplary embodiment of the SSS LPF electrically coupled to a SIW cavity resonator, in accordance with an aspect of the present invention.
Figure 5A:
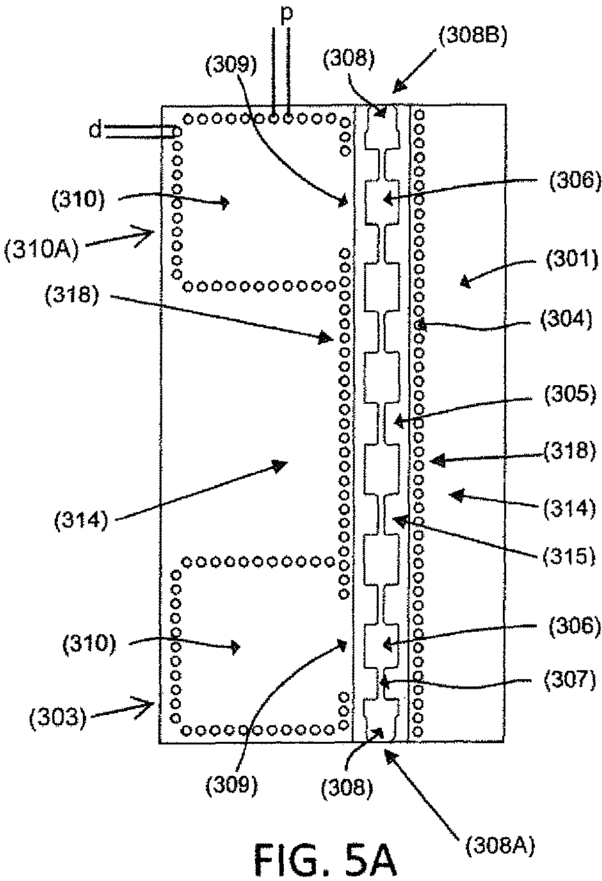
FIG. 5A is a top view without the top air cavity of an exemplary embodiment of a SSS LPF electrically coupled to a SIW cavity resonator, in accordance with an aspect of the present invention.
Figure 5B:
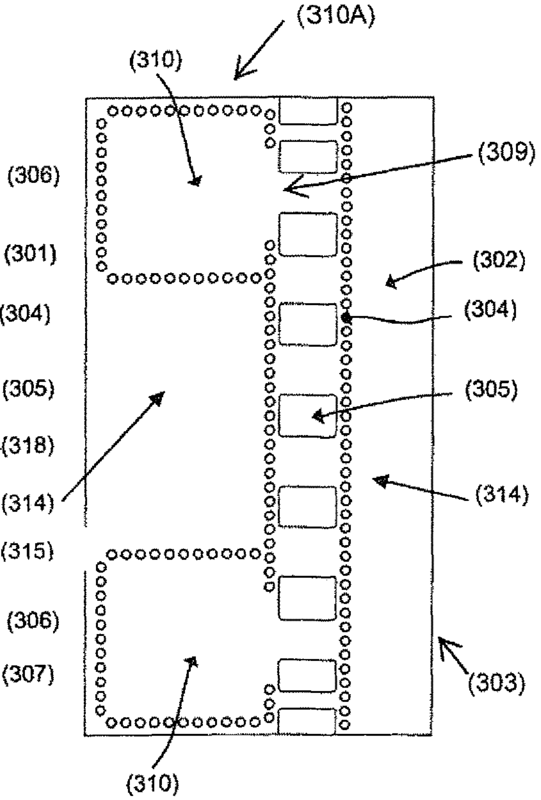
FIG. 5B is a bottom view without the bottom air cavity of an exemplary embodiment of a SSS LPF electrically coupled to a SIW cavity resonator, in accordance with an aspect of the present invention.
Figure 6:
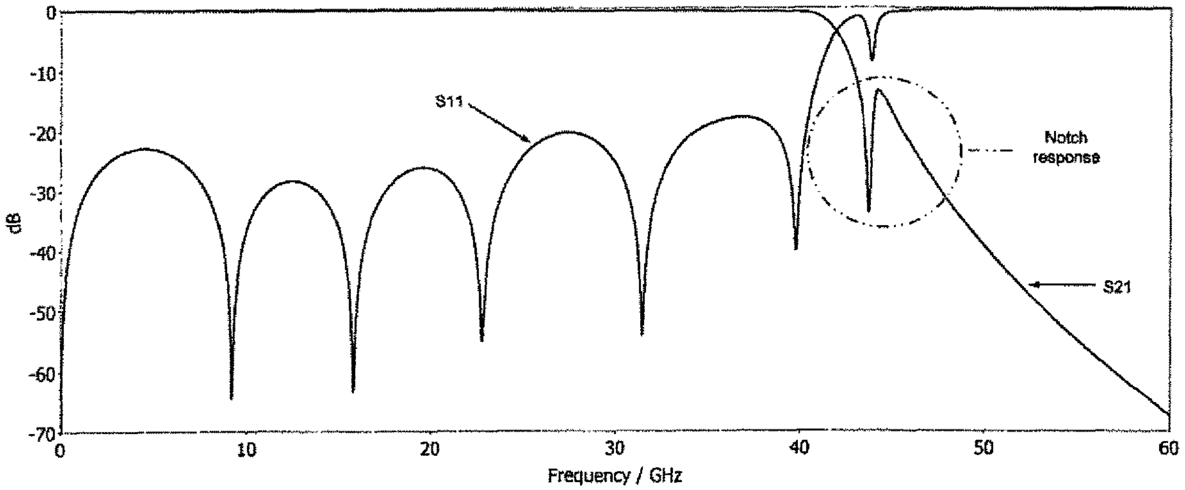
FIG. 6 is a graph showing an exemplary embodiment of a full-wave simulation of the circuit in FIGS. 4, 5A and 5B, showing a response in dB versus frequency showing a notch response, in accordance with an aspect of the present invention.

Referring to FIGS. 4, 5A and 5B, a device 300 (FIG. 4) may be seen. The device 300 (FIG. 4) electrically couples a SSS LPF 100 shown in FIG. 1 to one or more SIW cavity resonator 310 as will be described below. The device 300 (FIG. 4) may have a dielectric substrate 303 having a top surface 301 (FIG. 4 AND 5A) and a bottom surface 302 (FIGS. 4 and 5B). In accordance with one embodiment, the dielectric substrate 303 is a low dielectric constant material. The dielectric substrate 303 may have one or more metal layers 314 (FIGS. 4 and 5A) formed on the top surface 301 (FIGS. 4 and 5A and/or bottom surface 302 (FIGS. 4 and 5B) of the substrate 303.

A filter circuit 315 (hereinafter filter 315) (FIGS. 4 and 5A) may be formed on the top surface 301 (FIGS. 4 and 5A) of the substrate 303. In accordance with one embodiment, the filter is a Low Pass Filter (LPF). The filter 315 (FIGS. 4 and 5A) may have an input 308A (FIG. 5A) and output 3088 (FIG. 5A). As may be seen in FIG. 5A, the filter 315 (FIGS. 4 and 5A) may be formed on the top surface 301 (FIGS. 4 and 5A) of the substrate 303 on a non-metalized area 305 positioned between a pair of metal layers 314 (FIG. 5A) on the top surface 301 (FIGS. 4 and 5A) of the substrate 303. The filter 315 (FIGS. 4 and 5A) may have a combination of low and high impedance elements. In the present embodiment, the input 308A (FIG. 5A) and output 308B (FIG. 5A) of the filter 315 (FIGS. 4 and 5A) may be formed of a transmission line 308 (FIGS. 4 and 5A). In accordance with one embodiment, the transmission line 308 (FIGS. 4 and 5A) may be 50 Ohm. One or more quasi-lumped elements, very low-impedance lines (hereinafter capacitive element) 306 (FIGS. 4 and 5A) and very short high-impedance lines (hereinafter inductive element) 307 (FIGS. 4 and 5A) may be coupled to the transmission lines 308 (FIGS. 4 and 5A).

In accordance with one embodiment, the filter 315 (FIGS. 4 and 5A) may alternate between low and high impedance elements. Thus, the filter 315 (FIGS. 4 and 5A) may have a 50 Ohm transmission line 308 (FIGS. 4 and 5A) coupled to a capacitive element 306 (FIGS. 4 and 5A), and then coupled to an inductive element 307 (FIGS. 4 and 5A), a second inductive element 307 (FIGS. 4 and 5A) attached to the output of a second capacitive element 306 (FIGS. 4 and 5A) and so on.

As may be seen in FIG. 5B, the bottom surface 302 (FIGS. 4 and 5B) of the substrate 303 may have metal layers 314 which may be used as ground layers. The areas on the bottom surface 302 (FIGS. 4 and 5B) of the substrate 303 which may be located directly below the capacitive elements 306 (FIGS. 4 and 5A) may be the ground plates of the capacitive elements 306 (FIGS. 4 and 5A). The bottom surface 302 (FIGS. 4 and 5B) of the substrate 303 may have non-metalized areas 305. The non-metalized areas 305 on the bottom surface 302 (FIGS. 4 and 5B) of the substrate 303 may correspond to the areas which may be located directly below where the inductive elements 307 (FIGS. 4 and 5A) may be positioned on the top surface 301 (FIGS. 4 and 5A) of the substrate 303.

The SSS LPF 100 (FIG. 1) may have a top ground plate 311 (FIG. 4) and a bottom ground plate 312 (FIG. 4). An air cavity 313 (FIG. 4) may be formed in the top ground plate 311 (FIG. 4) and in the bottom ground plate 312 (FIG. 4). In the present embodiment, the air cavities 313 (FIG. 4) may be formed in a bottom surface 311A (FIG. 4) of the top ground plate 311 (FIG. 4) and on a top surface 312A (FIG. 4) of the bottom ground plate 312 (FIG. 4). The air cavities 313 (FIG. 4) formed in the top ground plate 311 (FIG. 4) and in the bottom ground plate 312 (FIG. 4) may align with the filter 315 (FIGS. 4 and 5A) formed on the top surface 301 (FIGS. 4 and 5A) of the substrate 303. Thus, the air cavity 313 (FIG. 4) on the top ground plate 311 (FIG. 4) may be positioned directly above the filter 315 (FIGS. 4 and 5A) when the top ground plate 311 (FIG. 4) is positioned on the top surface 301 (FIGS. 4 and 5A) of the substrate 303 while the air cavity 313 (FIG. 4) on the bottom ground plate 312 (FIG. 4) may be positioned directly below the filter 315 (FIGS. 4 and 5A) when the bottom ground plate 312 (FIG. 4) is positioned on the bottom surface 302 (FIGS. 4 and 5B) of the substrate 303. The air cavity 313 (FIG. 4) may have a width equal or slightly larger than the width of the channel formed by the non-metalized area 305.

Figure 1:
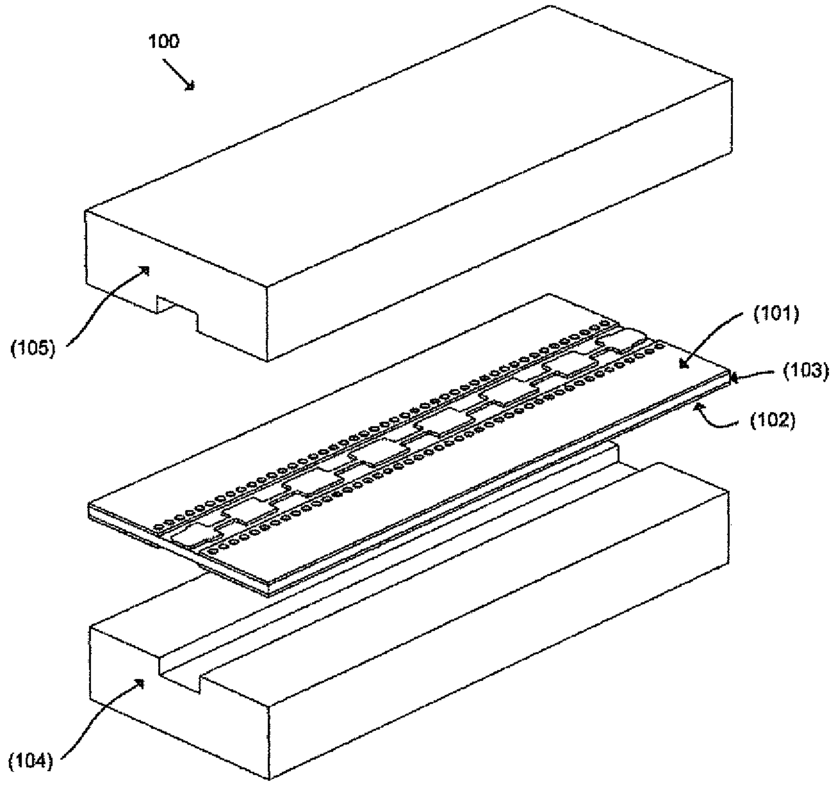
FIG. 1 (Prior Art)
FIG. 1 is a perspective view on a prior art Suspended Substrate Stripline (SSS) Low Pass Filter (LPF)
Figure 2:
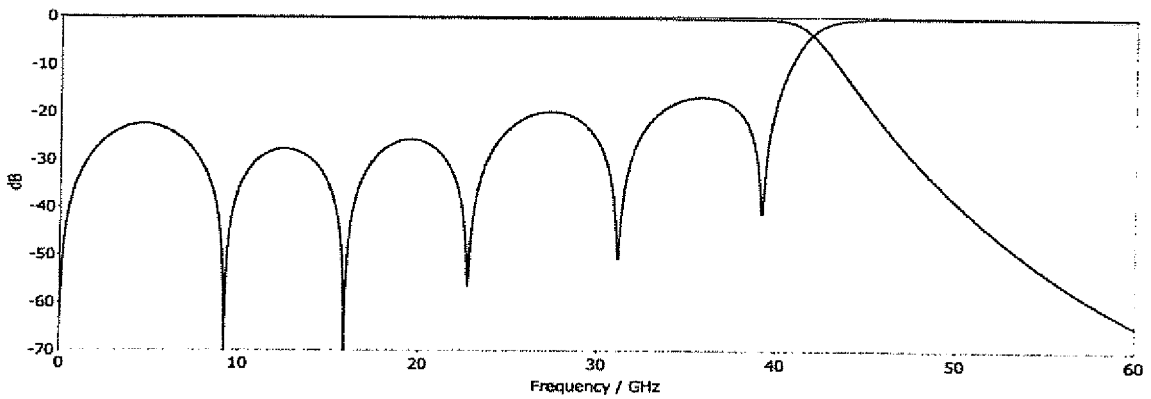
FIG. 2 (Prior Art)
FIG. 2 is a graph depicting a full-wave simulation of the SSS LPF depicted in FIG. 1 showing a response in decibel dB versus frequency.
Figure 3:
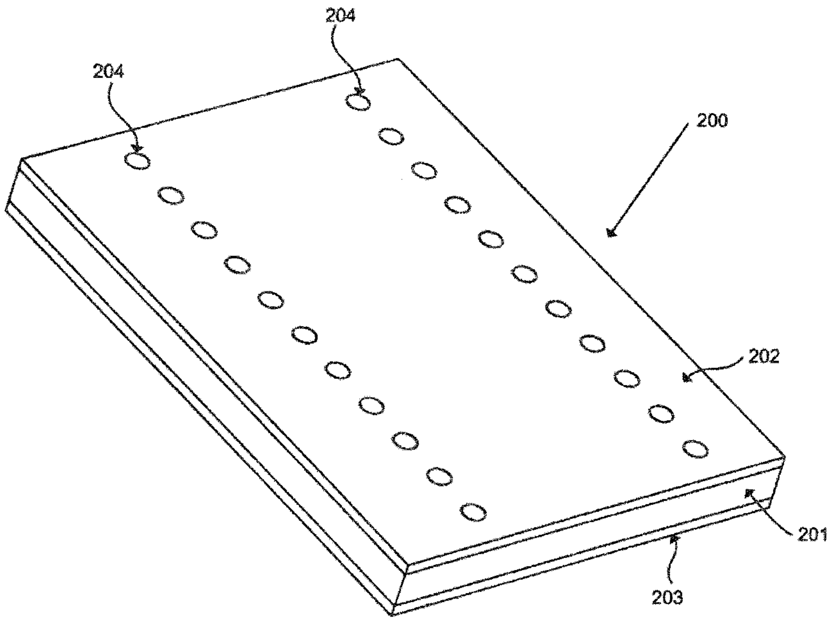
FIG. 3 (Prior Art)
FIG. 3 is a perspective view on a prior art Substrate Integrated Waveguide (SIW) line.

The device 300 (FIG. 4) may have a SIW cavity resonator 310 coupled to SSS LPF 100 (FIG. 1). The SIW cavity resonator 310 may be used for improving notch depth. The SIW cavity resonator 310 may allow one to create a notch response either in the passband or at the transition band. The size of the SIW cavity resonator 310 may determine whether the notch response will be either in the passband or at the transition band. In the present embodiment, if the size of the SIW cavity resonator 31 is increased, the notch response may be shifted from the transition band towards the passband.

Coupling of the SIW cavity resonator 310 to SSS LPF 100 (FIG. 1) may be controlled through an opening 309 formed in the SIW cavity resonator 310. By adding or removing vias 304, one may increase and/or decrease the size of the opening 309 thereby controlling how coupling of the SIW cavity resonator 310 to SSS LPF 100 (FIG. 1).

In the present embodiment shown, a pair of SIW cavity resonators 310 may be coupled to SSS LPF 100 (FIG. 1). The pair of SIW cavity resonators 310 may be symmetrical and thus may be the same size and shape. Each of the pair of SIW cavity resonators 310 may be formed on the top surface 301 (FIGS. 4 and 5B) of the substrate 303. Each of the pair of SIW cavity resonators 310 may be positioned on the same side of the filter 315 (FIGS. 4 and 5A). Thus, as may be shown in FIGS. 4 and 5A, the pair of SIW cavity resonators 310 may both be positioned on a left side of the filter 315 (FIGS. 4 and 5A). One of the pair of SIW cavity resonators 310 may be positioned on each opposing end of the filter 315 (FIGS. 4 and 5A). Thus, one of the pair of SIW cavity resonators 310 may be positioned proximate the input 308A (FIG. 5A) of the filter while the second of the pair of SIW cavity resonators 310 may be positioned proximate the output 308B (FIG. 5A) of the filter 315 (FIGS. 4 and 5A).

The device 300 (FIG. 4) may have a plurality of vias 304. The vias 304 may be formed around a perimeter of the filter 315 (FIGS. 4 and 5A). However, no vias 304 may be formed across the input 308A (FIG. 5A) or the output 308B (FIG. 5A). of the filter 315 (FIGS. 4 and 5A). As shown in the present embodiment, the vias 304 may be configured in two parallel rows 318 (FIGS. 4 and 5A) with the filter 315 (FIGS. 4 and 5A) positioned between the parallel rows 318 (FIGS. 4 and 5A) of vias 304. The vias 304 may also be used to delimit the area of the each of the pair of SIW cavity resonators 310 and to determine the resonant frequency. The vias 304 may be used to connect the metal layer 314 on the top surface 301 (FIGS. 4 and 5A) of the substrate 303 to the metal layer 314 formed on the bottom surface 302 (FIGS. 4 and 5B) of the substrate 303. In the present embodiment, the metal layer 314 on the top surface 301 (FIGS. 4 and 5A) and the bottom surface 302 (FIGS. 4 and 5B) of the substrate 303 are grounded metal layers 314.

Each of the vias 304 may be defined to have a diameter d and a pitch p which may be defined as the distance between a center point of adjacent vias 304. For the SIW cavity, the following conditions may be required:

$$d<(\lambda_g/5) \tag{1a}$$

$$p\leq 2d \tag{1b}$$

$$0.5<d/p<0.8 \tag{1c}$$

where $\lambda_g$ is the guided wavelength in the SIW.

The conditions 1a-1c are important parameters to minimize leakage loss between vias. Finally, a nonessential but desirable condition for the manufacturing process is to have d comparable to the thickness of the substrate 303. In accordance with one embodiment, the vias 304 may have a diameter of 6 mil and a pitch of 8.8 mil.

The vias 304 may form an enclosed area 310A having an opening 309 to delimit the area of the each of the pair of SIW cavity resonators 310. The enclosed area 310A may be formed by placing vias 304 around a predefined geometric perimeter. As may be shown in FIGS. 4, 5A and 5B, the opening 309 may be formed by not placing the vias 304 in a predefined area around the perimeter. The enclosed area 310A may take on different forms. In the present embodiment, the enclosed area 310A may be a quadrilateral. More specifically, the enclosed area 310A may be a square or rectangle. The enclosed area 310A may be a circle as well. As previously stated, each of the pairs of SIW cavity resonators 310 may be symmetrical. Thus, each of the enclosed areas 310A may be the same size and shape.

The opening 309 may be used for controlling the coupling between the SIW cavity resonator 310 and the SSS LPF 100 (FIG. 1). By increasing and/or decreasing the size of the opening 309, one may be able to control the coupling between the SIW cavity resonator 310 and the SSS LPF 100 (FIG. 1). The opening 309 may be formed to be adjacent to and/or directed towards the transmission line 308 (FIGS. 4 and 5A). More specifically, the opening 309 of the SIW cavity resonator 310 may be placed next to a capacitive element 306 (FIGS. 4 and 5A) from the SSS LPF 100 (FIG. 1). In the present embodiment, one of the pair of SIW cavity resonators 310 is positioned so that the opening 309 may be adjacent to the second capacitive element 306 (FIGS. 4 and 5A) of the filter 315 (FIGS. 4 and 5A) while the second of the pair of SIW cavity resonators 310 is positioned so that the opening 309 may be adjacent to the penultimate capacitive element 306 (FIGS. 4 and 5A) of the filter 315 (FIGS. 4 and 5A).

In accordance with one embodiment, the integration of a Substrate Integrated Waveguide (SIW) with a Suspended Substrate Stripline (SSS) filter for introducing a notch response is disclosed. The present embodiment may be extended to the Suspended Integrated Strip-Line (SISL).

The foregoing description is illustrative of particular embodiments of the application but is not meant to be a limitation upon the practice thereof. The following claims, including all equivalents thereof, are intended to define the scope of the application.

What is claimed is:

1. A Suspended Substrate Stripline (SSS) filter comprising:
- a substrate having metal layers formed on a top surface and a bottom surface thereof;
- a filter circuit formed on a non-metalized area and positioned between a pair of the metal layers on the top surface of the substrate;
- a top ground plate having a first air cavity formed on a bottom surface of the top ground plate, wherein the first air cavity on the top ground plate is positioned directly above the filter circuit when the top ground plate is positioned on the top surface of the substrate;
- a bottom ground plate having second air cavity formed on a top surface of the bottom ground plate, wherein the second air cavity on the bottom ground plate is positioned directly below the filter circuit when the bottom ground plate is positioned on the bottom surface of the substrate; and
- a Substrate Integrated Waveguide (SIW) cavity resonator coupled to the filter circuit to create a notch response in the SSS filter.

2. The SSS filter of claim 1, comprising a plurality of vias, wherein the plurality of vias comprises:
- two parallel rows of vias extending through the substrate, wherein the filter is positioned between the parallel rows of vias; and
- a set of vias extending through the substrate delimiting an area of the SIW cavity resonator.

3. The SSS filter of claim 2, wherein an opening is formed in the set of vas delimiting an area of the SIW cavity resonator for coupling the SIW cavity resonator to the filter circuit.

4. The SSS filter of claim 1, wherein the SIW cavity resonator has an opening for coupling the SIW cavity resonator to the filter circuit.

5. The SSS filter of claim 1, wherein the filter circuit is formed on a non-metalized area on the top surface of the substrate located between a pair of metal layers.

6. The SSS filter of claim 1, wherein the filter circuit comprises:
- a transmission line formed on an input and an output of the filter circuit; and
- a plurality of inductive and capacitive elements coupled to the transmission line.

7. The SSS filter of claim 6, wherein the SIW cavity resonator comprises a pair of SIW cavity resonators, wherein each of the pair of SIW cavity resonators are coupled to one of the capacitive elements in the filter circuit.

8. The SSS filter of claim 1, wherein the SIW cavity resonator comprises a pair of SIW cavity resonators, wherein each of the SIW cavity resonators are the same shape and size.

9. The SSS filter of claim 1, wherein the SIW cavity resonator comprises a pair of SIW cavity resonators.

10. A Suspended Substrate Stripline (SSS) Low Pass Filter (LPF) comprising:
- a substrate having metal layers formed on a top surface and a bottom surface thereof;
- a LPF circuit formed on a non-metalized area of the top surface of the substrate and positioned between a pair of the metal layers formed on the top surface of the substrate;
- a top ground plate having a first air cavity formed on a bottom surface of the top ground plate, wherein the first air cavity on the top ground plate is positioned directly above the LPF circuit when the top ground plate is positioned on the top surface of the substrate;
- a bottom ground plate having a second air cavity formed on a top surface of the bottom ground plate, wherein the second air cavity on the bottom ground plate is positioned directly below the LPF circuit when the bottom ground plate is positioned on the bottom surface of the substrate;
- a Substrate Integrated Waveguide (SIW) cavity resonator coupled to the LPF circuit to create a notch response in the SSS LPF; and
- a plurality of vias, wherein the plurality of vias comprises:
- two parallel rows of vias extending through the substrate, wherein the filter is positioned between the parallel rows of vias; and
- a set of vias extending through the substrate delimiting an area of the SIW cavity resonator; and
- an opening is formed in the set of vias delimiting the area of the SIW cavity resonator for coupling the SIW cavity resonator to the LPF circuit.

11. The SSS LPF of claim 10, wherein the LPF circuit comprises:
- a transmission line formed on an input and an output of the LPF circuit; and
- a plurality of inductive and capacitive elements coupled to the transmission line, wherein the plurality of inductive and capacitive elements alternate in position from the input to the output of the LPF circuit.

12. The SSS LPF of claim 11, wherein the SIW cavity resonator comprises a pair of SIW cavity resonators defined by a first set of vias extending through the substrate delimiting an area of a first SIW cavity resonator, and a second set of vias extending through the substrate delimiting an area of the a second SIW cavity resonator, wherein the opening comprises a first opening formed in the first SIW cavity resonator and a second opening formed in the second SIW cavity.

13. The SSS LPF of claim 10, wherein the SIW cavity resonator comprises a pair of SIW cavity resonators defined by a first set of vias of the set of vias extending through the substrate delimiting an area of a first SIW cavity resonator and a second set of vias of the set of vias extending through the substrate delimiting an area of a second SIW cavity resonator.

14. The SSS LPF of claim 13, wherein the pair of SIW cavity resonators are asymmetrical and formed on opposite sides of the LPF circuit.

15. The SSS LPF of claim 13, wherein the pair of SIW cavity resonators are symmetrical and formed on a same side of the LPF circuit.

16. A Suspended Substrate Stripline (SSS) Low Pass Filter (LPF) comprising:

a substrate having metal layers formed on a top surface and a bottom surface thereof;

a LPF circuit formed on a non-metalized area of the top surface of the substrate and positioned between a pair of the metal layers formed on the top surface of the substrate;

a top ground plate having a first air cavity formed on a bottom surface of the top ground plate, wherein the first air cavity on the top ground plate is positioned directly above the LPF circuit when the top ground plate is positioned on the top surface of the substrate;

a bottom ground plate having a second air cavity formed on a top surface of the bottom ground plate, wherein the second air cavity on the bottom ground plate is positioned directly below the LPF circuit when the bottom ground plate is positioned on the bottom surface of the substrate;

a pair of Substrate Integrated Waveguide (SIW) cavity resonators coupled to the LPF circuit to create a notch response in the SSS LPF; and a plurality of vias, wherein the plurality of vias comprises:

two parallel rows of vias extending through the substrate, wherein the filter is positioned between the parallel rows of vias;

a first set of vias extending through the substrate delimiting an area of a first SIW cavity resonator, wherein an opening is formed in the first set of vias delimiting the area of the first SIW cavity resonator for coupling the first SIW cavity resonator to the LPF circuit; and a second set of vias extending through the substrate delimiting an area of a second SIW cavity resonator, wherein an opening is formed in the second set of vias delimiting the area of the second SIW cavity resonator for coupling the second SIW cavity resonator to the LPF circuit.

17. The SSS LPF of claim 16, wherein the pair of SIW cavity resonators are asymmetrical and formed on opposite sides of the LPF circuit.

18. The SSS LPF of claim 16, wherein the pair of SIW cavity resonators are symmetrical and formed on a same side of the LPF circuit.

19. The SSS LPF of claim 16, wherein the LPF circuit comprises:

a transmission line formed on an input and an output of the LPF circuit; and a plurality of inductive and capacitive elements coupled to the transmission line, wherein the plurality of inductors and capacitors alternate in position from the input to the output of the LPF circuit.

20. The SSS LPF of claim 16, wherein the pair of SIW cavity resonators are of a same size and shape.

* * * * *